United States Patent [19]

Wilson

[11] 3,860,409

[45] Jan. 14, 1975

[54] PROCESS FOR PREPARATION OF ACIDIC FERTILIZER CONTAINING SLAG

[76] Inventor: Harold W. Wilson, P.O. Box 9851, El Paso, Tex. 79989

[22] Filed: Nov. 29, 1972

[21] Appl. No.: 310,545

[52] U.S. Cl............................ 71/62, 71/63, 71/64 D, 71/1
[51] Int. Cl..................................................... C05d
[58] Field of Search.............. 71/1, 62, 63, 40, 64 D

[56] References Cited
UNITED STATES PATENTS

| | | | |
|---|---|---|---|
| 2,927,851 | 3/1960 | Wilson | 71/62 |
| 3,145,093 | 8/1964 | Wilson | 71/62 |
| 3,159,477 | 12/1964 | Wilson | 71/62 |
| 3,201,222 | 8/1965 | Wilson | 71/62 X |

Primary Examiner—Frank A. Spear, Jr.
Assistant Examiner—Ferris H. Lander
Attorney, Agent, or Firm—Clarence A. O'Brien; Harvey B. Jacobson

[57] ABSTRACT

Soil fertilizing and soil improving gel products may be made by a process which comprises admixing a pulverized waste copper slag with concentrated sulfuric acid having a strength of from 95 to 98% by weight and adding limited quantities of water to the acid wetted slag whereby the resulting slag-acid-water composition reacts to form a dry granular aggregate composed of about 80-85% water soluble partially hydrated, but mostly anhydrous, metallic sulfate salts in combination with metasilicic acid-adsorbed sulfuric acid, about 15-20% sulfuric acid insoluble metal silicates, and approximately 1-2% of elemental sulfur.

7 Claims, No Drawings

PROCESS FOR PREPARATION OF ACIDIC FERTILIZER CONTAINING SLAG

BACKGROUND OF THE INVENTION

1. Field of the Invention

The present invention relates to fertilizing material for calcareous (alkaline) soils and, more particularly, to a high equivalent acidity-slag fertilizer.

2. Description of the Prior Art

Highly acidic fertilizers for calcareous soils made from iron and copper refining slags are already well known. However, there has been a continuing need to develop fertilizers, and processes for making same, which have increased equivalent acidity per unit weight and which will release their acidity to the soil over an extended period of time.

Processes for making acidic fertilizers from reverberatory copper refining slag by treatment thereof with acid are taught in applicant's earlier U.S. Pat. Nos. 2,927,851 and 3,145,093. In the former, the slag is treated with concentrated sulfuric acid in the presence of relatively large quantities of water. In the latter, dry (non-wetted) slag is treated with hot, dilute aqueous solutions of sulfuric acid. In both processes, the reaction between the water present, the acid and the slag is virtually instantaneous and only partial chemical decomposition of the oxidic-silicic components of the slag takes place with the result that the products still contain substantial amounts of acid reactable, but unreacted, residues. Extensive studies have shown that the processes taught in the aforementioned patents are incapable of fully decomposing these residues even if amounts of water and acid far in excess of stoichiometric requirements are used. The products resulting from the processes taught in applicant's earlier patents consist of variable combinations of completely hydrated salts of sulfuric acid, such as ferrous sulfate heptahydrate ($FeSO_4 \cdot 7H_2O$), partially hydrated salts of sulfuric acid, such as calcium hemihydrate ($CaSO_4 \cdot \frac{1}{2}H_2O$), and considerable amounts of acid reactable, but chemically unreacted, oxidic and siliceous residues, such as iron and aluminum oxides and silicates ($FeSiO_3$, $Al_2SiO_5$, $FeO$, and the like). The equivalent acidity, expressed as sulfuric acid, of the products of U.S. Pat. Nos. 2,927,851 and 3,145,093 are about 30 to 35% and 40 to 45%, respectively.

SUMMARY OF THE INVENTION

It is therefore an object of the present invention to provide a process for causing substantially all of the acid reactable components of the pulverized waste slag to react with the sulfuric acid.

It is another object of the present invention to provide a process for preparing acid containing fertilizer slag wherein the acid salts are anhydrous or only partially hydrated and therefore the equivalent acidity is about 50% higher than products prepared by heretofore known processes.

It is still another object of this invention to provide a highly acidic fertilizer slag having an extended use-life in calcareous soil whereby it will provide more available iron and equivalent acidity for a longer period of time.

Other objects and advantages will become apparent from the following description and appended claims.

Briefly stated, in accordance with the aforesaid objects, the present invention provides a process for making soil fertilizing and soil improving gel products comprising the steps of admixing a pulverized waste copper slag with concentrated sulfuric acid having a strength from about 95 to 98% by weight to thoroughly wet the slag and to displace air therefrom, and adding a limited quantity of water to the acid wetted slag to permit substantially all of the acid reactable components of the slag to react with the acid. The result is partial dehydration of the acid and formation of dried granular gel products containing large quantities of equivalent acid. The fertilizer products resulting from the process of the present invention consist essentially of dry, granular aggregates composed of approximately 80–85% of water soluble, partially hydrated, but mostly anhydrous, metallic sulfate salts in combination with metasilicic acid-absorbed sulfuric acid, approximately 15–20% of sulfuric acid insoluble iron and aluminum silicates, and approximately 1–2% of elemental sulfur.

DETAILED DESCRIPTION OF THE INVENTION

The slag which forms the starting material for the acidic fertilizer is a slag obtained from the refining of copper ores by use of the reverberatory refining process and has essentially the following general composition: total iron expressed as Fe metal — 15 to 35%; silica — 25 to 40%; calcium oxide — 8 to 10%; aluminum oxide — 6 to 8%; magnesium oxide — 1½ to 3%; zinc — 2 to 3%; manganese oxide — approximately 1%; and usually less than 1% each of copper, lead, and sulfur, with trace amounts of elements such as boron, molybdenum, nickel, gold and silver. It appears immaterial whether the slag is of the quenched or non-quenched type. Preferably, the pulverized slag particles all pass a 100 mesh (U.S. Standard Sieve) screen. Ideally, the particles have a size distribution whereby about 90% pass a 200 mesh screen and 99% are retained on a 300 mesh screen. This distribution is advantageous since it assures sufficiently small particles to be readily wetted on admixture with the concentrated acid, yet with a substantial absence of difficult-to-handle fine particles.

According to the present process, pulverized slag particles are exposed initially to treatment with concentrated sulfuric acid (95 to 98% $H_2SO_4$, by weight) in the absence of water other than the minor content found present in the concentrated acid. The particles are well mixed with the concentrated acid to thoroughly wet the particles and to displace practically all of the air therefrom. This treatment is in contrast to the initial treatment of pulverized waste copper slag with water or dilute acid as taught by the prior art. According to the prior art techniques, the slag particles formed agglomerates of dry particles with air coating, surrounded by only partially wetted slag particles having occluded air. For exammple, microscopic examination of the product of the process described in U.S. Pat. No. 2,927,851 showed that after water-wetting the slag and treating it with concentrated sulfuric acid, as much as 28% of the slag remained completely unwetted and unattacked chemically by the sulfuric acid. Even after prolonged vigorous mixing of pulverized waste slag with water alone, as taught in U.S. Pat. NO. 2,927,851, as much as 16% of the exposed slag particles remained unwetted. In view of these observations, it is proposed herein that in order to achieve maximum reactivity between pulverized waste copper slag particles and sulfuric acid, the slag must initially be thoroughly admixed with and wetted by concentrated sulfuric acid (95 to 98% $H_2SO_4$) in order that all or essentially all of the air present (predominantly entrained air from pulverization) on the slag particle faces is displaced by the acid. After total air displacement has been achieved (at least after all bubbling ceases), the resultant slag-acid mixture is combined with limited amounts of water to cause chemical reaction to take place between all or nearly all of the acid-reactable components of the slag (metallic oxides and silicates, e.g., the oxidic and siliceous substances such as ferrous oxide, ferrous silicate, aluminum oxide, aluminum silicate, and the like) and the sulfuric acid, in the presence of limited amounts of water, to cause partial dehydration of the sulfuric acid and formation of anhydrous and semi-anhydrous metallic salts of sulfuric acid, such as ferrous sulfate anhydrite and ferrous sulfate monohydrate.

The chemical mechanism underlying the present invention can best be illustrated using the following equations showing ferrous oxide and ferrous silicate as the predominant components of waste slag and as representative of all of the acid reactable oxides and silicates present in waste copper slags:

$FeO + H_2SO_4 \rightarrow FeSO_4 \cdot H_2O$ $FeSiO_3 + H_2SO_4 \rightarrow FeSO_4 + H_4SiO_4$ $H_4SiO_4 + H_2SO_4 \rightarrow H_2SiO_3 \cdot H_2SO_4 + H_2O$ The final products obtained from use of the present process will consist of particulate aggregates of approximately 15 to 20% of acid unreactable (acid insoluble) metallic silicates, approximately 1 to 2% elemental sulfur, and 80 to 85% water soluble anhydrous metallic sulfate salts of iron, calcium, magnesium, aluminum, manganese, zinc, and copper in combination with trace amounts of partially hydrated salts of the same elements, all in combination with metasilicic acid-absorbed sulfuric acid. These products exhibit a sulfuric acid equivalence ranging between 45 and 60% depending upon the amount of acid and the amount of slag initially employed in processing. The final products contain essentially no higher hydrated salts such as the di-, penta- or heptahydrates. Inasmuch as the rates of water dissolution of the anhydrous salts, such as ferrous sulfate anhydrite which is present in relatively large quantities, is lower than the rates of dissolution of the higher hydrated salts, the available iron in the final products will be distributed to the soil over a longer and more uniformly progressive rate than with similar prior art products which contained predominantly the higher hydrated salts.

When the concentrated sulfuric acid is added to and mixed with the pulverized slag, the temperature rapidly rises from ambient to approximately 30° to 40° C. above ambient, partial gelation occurs initially and then disappears as mixing is continued. At this time the slag particles are substantially completely free of air coating and are coated instead with sulfuric acid. Continued mixing of the slag and acid beyond the point of total air displacement from the slag particle interfaces and complete wetting of the slag particles appears to contribute nothing to the process.

The amount of water to be added to the acid-wetted slag to achieve optimum results is directly related to the amount of slag present, rather than to the amount of acid present, as long as minimum quantities of acid are present. When at least sufficient acid relative to the slag is present to react with all acid reactable constituents of the slag, i.e., an acid-to-slag ratio of 1:1 or more on a weight basis, the water-to-slag ratio, by weight, should be in the range 1:4 to 1:5. It will be appreciated, in this regard, that it is particularly desirable in the practice of the present invention to use a quantity of acid greatly in excess of that represented by an acid-to-slag ratio of 1:1 in order to achieve maximum equivalent acidity. The theoretical maximum useful quantity of acid appears to be the stoichiometric amount of concentrated sulfuric acid necessary to replace all possible waters of hydration on the metallic sulfate salts formed by the present process.

The use on a weight basis of less than one part of water to five parts of slag is insufficient water while the use on a weight basis of more than one part of water to four parts of slag is excessive water and will cause the formation of unwanted multi-hydrated salts. In either case, i.e., too much or too little water, the chemical reactions between the reactable components of the slag and the sulfuric acid are incomplete with the result that: (1) the optimum heat of reaction required for dehydration of part of the sulfuric acid is not reached; (2) desirable anhydrous salts are not formed; and (3) undesirable semi-solid to liquid systems, containing high percentages of unreacted slag components, are formed. When the preferred ratio is utilized, i.e., 1:4 to 1:5 parts by weight of water to slag, immediately after incorporation of the water into the slag-acid mix the temperature of the slag-acid-water composition will begin to rise and will continue to rise to temperature in the range 340° to 400° F. In a system having a water-to-slag ratio of 1:5, the lower end of the temperature range (340° F.) represents an acid-to-slag ratio of about 1:1 while the upper end of the temperature range (400° F.) requires an acid-to-slag ratio of about 3:2. Since the temperatures (340° to 400° F.) achieved exceed known decomposition temperatures of every hydrated metallic sulfuric acid salt that could exist based upon the known metal ion content of the slag employed, it will be appreciated that even though hydrated metallic salts may be formed in this process, in the over-all reactions hydrated salts could exist only transitorily. The tremendous amount of heat generated by the reaction causes any hydrated salts to become dehydrated almost as rapidly as they are formed and thus hydrated salts are essentially non-existent in the final product.

It is important that after the limited quantity of water is added to the concentrated sulfuric acid-wetted slag, the resultant slag-acid-water mix is allowed to remain in a state of quiescence, i.e., with the use of the very minimum, preferably none, of mixing. During this period of quiescence the mix undergoes vigorous reaction and temperature change and a gel structure is formed. The gel structure, with its high adsorptive qualities, holds all the materials which are formed during reaction with the acid and hydrolysis. It is preferred to continue the quiescent state until the slag-acid-water mix becomes semi-cooled and appears as a dry, solid aggregate of friable granules, after which it is ready for immediate use as a superior grade of acidic fertilizer-containing slag.

The process of the present invention is illustrated by the following example:

EXAMPLE

A 100 pound lot of pulverized waste copper slag having essentially the composition hereinbefore set forth (90% minus 200 mesh U.S. Standard Sieve particle size) in a suitable container was intimately combined with 140 pounds of concentrated sulfuric acid (95+% $H_2SO_4$). When bubbling ceased, a 20 pound lot (approximately 2.4 U.S. gallons) of water was added all at one time to the slag-acid mixture and quickly combined therewith after which the slag-acid-water composition was allowed to stand until its maximum temperature had been achieved followed by unassisted cooling to or near ambient temperature. The resulting dry, solid aggregate was then broken apart to the desired size for immediate packaging or use.

While the present invention has been described with reference to particular embodiments thereof, it will be understood that numerous modifications can be made by those skilled in the art without actually departing from the scope of the invention. Accordingly, all modifications and equivalents may be resorted to which fall within the scope of the invention as claimed.

What is claimed as new is as follows:

1. A process for making soil fertilizing and soil improveing gel products comprising the steps of:
    a. intimately mixing a pulverized waste copper slag obtained from the reverberatory refining of copper ore with concentrated sulfuric acid having a strength, by weight, in the range from 95 to 98% $H_2SO_4$ in an acid-to-slag ratio, by weight, of at least 1:1 so as to thoroughly wet the slag and to substantially displace the air therefrom;
    b. adding a quantity of water to said acid-wetted slag based upon the weight of said slag, whereby the ratio, by weight, of water-to-slag in the resulting slag-acid-water composition is in the range 1:4 to 1:5; and
    c. allowing said slag-acid-water composition to react to form dry granular gel products containing large quantities of equivalent acid.

2. A process, as claimed in claim 1, wherein said slag contains from 15 to 35% total iron expressed as Fe metal; 25 to 40% silica; 8 to 10% calcium oxide; 6 to 8% aluminum oxide; 1½ to 3% magnesium oxide; 2 to 3% zinc; about 1% manganese oxide; copper, lead and sulfur in quantities smaller than 1%; and, trace amounts of boron, molybdenum, nickel, gold and silver.

3. A process as claimed in claim 1, wherein the ratio of acid to slag is greater than 1:1.

4. A process, as claimed in claim 1, wherein the ratio of acid to slag is 3:2 and the ratio of water to slag is 1:5.

5. A process, as claimed in claim 1, wherein said slag-acid-water composition is maintained in a quiescent state to allow said composition to react.

6. A gelatinous soil improving a soil fertilizing composition comprising a dry, granular aggregate consisting essentially of about 80 to 85% water soluble anhydrous metallic sulfate salts and trace amounts of partially hydrated metallic sulfate salts in combination with metasilicic acid-adsorbed sulfuric acid; about 15 to 20% sulfuric acid insoluble metallic silicates; and about 1 to 2% elemental sulfur, said composition having a sulfuric acid equivalence in the range from 45 to 60%.

7. A composition, as claimed in claim 6, wherein the metals of said metallic sulfate salts are selected from the group consisting of iron, calcium, magnesium, aluminum, manganese, zinc, copper and mixtures thereof.

* * * * *